UNITED STATES PATENT OFFICE.

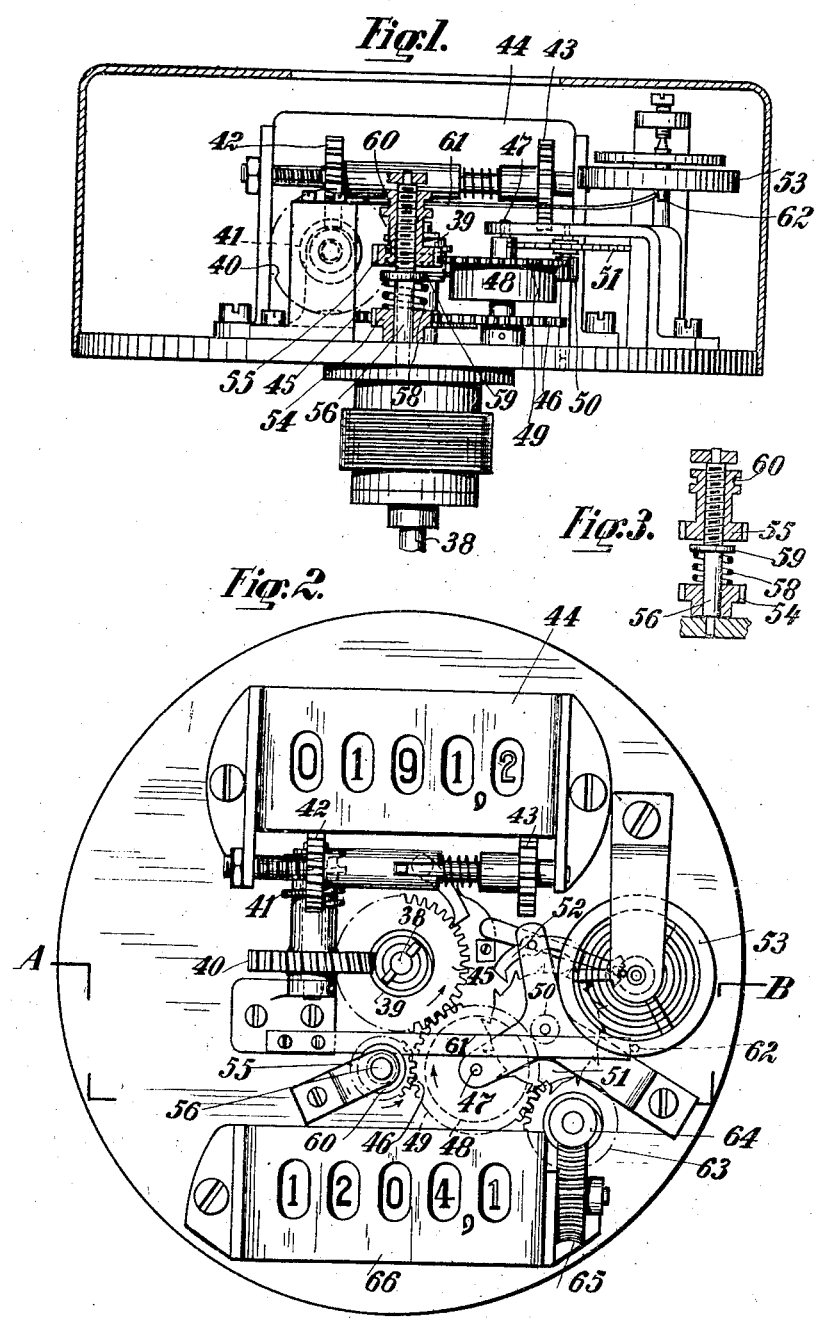

FRIEDRICH WILHELM GUSTAV BRUHN, OF BERLIN, GERMANY.

INDICATING APPARATUS FOR SHAFTS.

1,251,859.     Specification of Letters Patent.     Patented Jan. 1, 1918.

Application filed March 28, 1916. Serial No. 87,234.

*To all whom it may concern:*

Be it known that I, FRIEDRICH WILHELM GUSTAV BRUHN, a citizen of the German Empire, residing at Berlin, in the Kingdom of Prussia, German Empire, have invented new and useful Improvements in Indicating Apparatus for Shafts, of which the following is a specification.

My invention relates to an indicating apparatus for shafts or spindles rotating with any intermittences, whereby both the number of revolutions of a revolving shaft or spindle and else, with the aid of an indicating mechanism driven from a clockwork mechanism (hereinafter for shortness referred to as a clock) the total duration of the periods of rotation of the rotary shaft or spindle are indicated.

The rotary shaft may appertain to any machine or apparatus, or it may receive its drive from the wheel of a motor or other vehicle or the like. In the latter case the indicating apparatus can measure and indicate the total of the distances traversed by the vehicle and the total duration of the periods of traveling.

According to the invention the throwing in and out of the indicating mechanism serving for indicating the total duration of the periods of revolution of the rotary shaft or spindle is effected by the relative axial movement of two wheels, one of which is driven from the rotary shaft, and the other from the clock that serves to drive the indicating mechanism.

The invention is illustrated in one example in the accompanying drawings in which Figure 1 is a front sectional elevation of the apparatus, the section being taken on A—B Fig. 2; Fig. 2 is a plan of the apparatus, while Fig. 3 is a detail view in which, for greater clearness, the wheels whose relative axial movement effects the throwing in and out of the indicating mechanism are shown separately from Fig. 1.

38 is the rotary shaft of which the total number of revolutions and the total duration of the periods of rotation are to be measured and indicated. From the shaft 38 a counter 44 is driven in the known way by means of a worm 39, worm wheel 40, worm 41, worm wheel 42 and toothed wheel 43, and serves, according to the particular purpose or application of the apparatus, for indicating either the number of revolutions of the shaft or the distances run say in kilometers or tenths of kilometers. On the shaft 38 is fixed a wheel 45 which meshes with a wheel 46 fixed on its spindle 47. To the spindle 47 is fixed the inner end of a clockwork driving spring (not shown) the outer end of which bears and slips in the known way against the inner wall of a barrel 48. The toothed wheel or rim 49 of the spring barrel is of the same size as the wheel 46 and meshes direct with the pinion 50 of the escapement wheel 51, which is checked in the known way by an anchor 52 and balance wheel 53. The wheels 46 and 49 mesh with two smaller wheels 54 and 55 mounted on a common spindle 56 and likewise of the same size as each other. The wheel 54 is not fast on the spindle 56 but is connected thereto by a friction clutch. In the example illustrated the friction clutch consists of a spring 58 bearing on the one hand against a collar or flange 59 of the spindle 56, and on the other hand against the wheel 54. The wheel 55 is likewise not fast on the spindle 56, but by means of inclined engaging faces it is constrained to move axially on the spindle 56 as soon as it is turned relatively to the spindle. In the example illustrated the spindle 56 is formed with a screw thread at its upper part and the toothed wheel 55 works thereon as a nut. Consequently when relative turning motion occurs between toothed wheel 55 and spindle 56 the toothed wheel 55 is caused to move axially on the wheel 55. In the boss of the toothed wheel spindle 56. 55 is turned a groove 60 in which engages a light lever 61 capable of pivoting or swinging about its left hand end. In the example illustrated the lever 61 consists of a leaf spring connected at its left hand end to a fixed part of the apparatus. The right hand end of the lever 61 is bent obliquely upward. When the wheel 55 is moved axially up or down on the spindle 56, the right hand end of the lever 61 will also be raised or lowered. Within the range of travel of the right hand end of the lever 61 lies the path of oscillation of a pin 62 fixed to the balance wheel 63. When the lever 61 is in its lower position the balance wheel 53 can vibrate freely. When the lever 61 is raised to the position shown, the balance wheel 53 is stopped, as the right hand end of the lever 61 then comes in front of the pin 62. The lever 61 and the pin 62 are so arranged that the balance wheel 53 is held near its point of reversal. On release of the stop the balance wheel at once begins to vibrate.

Let us assume that the parts of the apparatus are in the position seen in Fig. 1, that the slip spring (not shown) in the barrel 48 is wound up a little and that the rotary shaft 38 is stationary. If now the rotary shaft 38 commences to rotate, the wheels 45, 46 and 54 will be turned in the directions shown by the arrows. The spindle 56 will be driven by the wheel 54 and in the same direction as this wheel by means of the friction clutch 58. As the spring barrel wheel 49 is stationary owing to the stoppage of the balance wheel, the wheel 55 is held against rotation. Consequently the spindle 56, rotating with the wheel 54, screws into the wheel 55 and causes this to move down axially, with the result that the lever 61 is rocked downward and releases the balance wheel; the clock work 48, 49, 50, 51, 52, 53 begins to go, the motion being controlled by the escapement. The wheel 46 usually runs faster than the wheel 49. Consequently the wheel 54 also runs faster than the wheel 55. Therefore the wheel 55 is moved farther down until it comes against the collar or flange 59. On the occurrence of further lead of the wheel 54, the spindle 56 cannot be rotated by the wheel 54 at the same speed as this wheel, but lags behind it, this being rendered possible by the friction clutch 58.

As the wheel 49 rotates slower than wheel 46, said wheel 49 cannot move wheel 55 faster than spindle 56 is driven by wheel 54, hence wheel 55 will not be moved upward on the spindle during the rotation of shaft 38.

When, however, the shaft 38 is stationary the wheel 55, driven by the wheel 49, screws upward again and the clock is again stopped.

The transmission ratio is so chosen that at the very least speed which can occur in practice the wheel 49 is overtaken by the wheel 46.

By reason of the arrangement described therefore the clockwork will go so long as the shaft 38 is rotating.

As the clockwork itself represents a time meter it is only necessary to transmit its motion to an indicating mechanism or other indicating device. In the example illustrated the indicating device consists of a counter 66 similar to the counter 44, and receiving its drive from the wheel 49 by means of the wheel 63, worm 64 and worm wheel 65.

The apparatus as illustrated can be employed direct as a distance and time meter for any vehicle. If the shaft 38 is driven from a vehicle wheel the distances traveled will be indicated in kilometers and tenths of kilometers by the counter 44, and the total duration of the times occupied by the individual journeys will be indicated in hours and tenths of hours by the counter 66.

The drive of the wheel 49 may also be effected by a separate or special clock wound up by hand. In such a case the throwing out and in of the time counter can be effected, as in the example illustrated, by stoppage or release of the balance wheel.

I claim:

1. In a device of the character described, the combination of a rotary shaft, mechanism for indicating the duration of rotation of said shaft, clock mechanism for driving the indicating mechanism, a spindle, a wheel thereon driven by the shaft and adapted to rotate the spindle, a wheel on the latter adapted to be driven by the clock mechanism, and movable axially on the spindle by the rotation of the latter, and means operated by said axial movement to release the clock mechanism.

2. In a device of the character described, the combination of a rotary shaft, mechanism for indicating the duration of rotation of said shaft, clock mechanism for driving the indicating mechanism, a spindle, a wheel thereon driven by the shaft and adapted to rotate the spindle, a stop member for the clock mechanism, and a wheel axially movable on the spindle in driving connection with the clock mechanism to actuate the stop member to lock the clock mechanism.

3. In a device of the character described, the combination of a rotary shaft, mechanism for indicating the duration of rotation of said shaft, clock mechanism for driving the indicating mechanism, a spindle, a wheel thereon in driving connection with said shaft, a friction clutch connecting the wheel and spindle, a wheel on the spindle in driving connection with the clock mechanism and movable axially on the spindle by a relative movement of the wheel and spindle and a stopping device for the clock mechanism actuated by the axial movement of said axially movable wheel.

4. In a device of the character described, the combination of a rotary shaft, mechanism for indicating the duration of rotation of said shaft, clock mechanism for driving the indicating mechanism, a spindle, a pinion thereon in gear with said shaft, a friction clutch connecting the pinion and spindle, an internally threaded pinion mounted on a threaded portion of the spindle, a gear included in the clock mechanism in mesh with the threaded pinion, and a stopping device for the clock mechanism adapted to be actuated by said threaded pinion to stop and start the clock mechanism.

In witness whereof I have hereunto set my hand in presence of two witnesses.

FRIEDRICH WILHELM GUSTAV BRUHN.

Witnesses:
HENRY HASPER,
ALLEN F. JENNINGS.

Copies of this patent may be obtained for five cents each, by addressing the "Commissioner of Patents, Washington, D. C."